United States Patent [19]

Maruoka

[11] 4,203,398

[45] May 20, 1980

[54] ELECTROSTATIC APPARATUS FOR CONTROLLING FLOW RATE OF LIQUID

[75] Inventor: Hiroyuki Maruoka, Yokohama, Japan

[73] Assignee: Nissan Motor Company, Limited, Yokohama, Japan

[21] Appl. No.: 794,137

[22] Filed: May 5, 1977

[30] Foreign Application Priority Data

| May 8, 1976 [JP] | Japan | 51-51694 |
| Jun. 24, 1976 [JP] | Japan | 51-73874 |
| Jun. 28, 1976 [JP] | Japan | 51-75585 |

[51] Int. Cl.² .......................... F15C 1/04; F02B 51/04
[52] U.S. Cl. .......................... 123/119 EC; 123/119 E; 137/807
[58] Field of Search .................... 123/119 EC, 119 E; 137/13, 807, 827

[56] References Cited

U.S. PATENT DOCUMENTS

| 2,763,125 | 9/1956 | Kadosch et al. | 137/807 X |
| 3,071,154 | 1/1963 | Cargill et al. | 137/807 |
| 3,518,462 | 6/1970 | Brown | 310/10 |
| 3,548,853 | 12/1970 | McEuen | 137/807 |
| 3,841,283 | 10/1974 | Wood | 123/119 EC X |
| 3,880,192 | 4/1975 | Denizov et al. | 137/827 |

FOREIGN PATENT DOCUMENTS

2455162 5/1975 Fed. Rep. of Germany.
427509 6/1967 Switzerland.

*Primary Examiner*—Tony Argenbright
*Attorney, Agent, or Firm*—Schwartz, Jeffery, Schwaab, Mack, Blumenthal & Koch

[57] ABSTRACT

Disclosed is an electrostatic apparatus for controlling the volume of liquid flow through a passage, without the use of mechanically moving parts comprising a pair of electrodes fixedly disposed in a liquid passage with a short distance therebetween in the direction of liquid flow therethrough, and an electric circuit to produce an electric field between the electrodes. The circuit includes a controller to vary the strength of the electric field and/or reverse the polarity. A flow-constricting orifice may be interposed between the electrodes. The liquid in the electric field tends to migrate toward one of the electrodes, so that the volume rate of the liquid flow in the passage can minutely be varied with good responsiveness to an external control signal.

7 Claims, 23 Drawing Figures

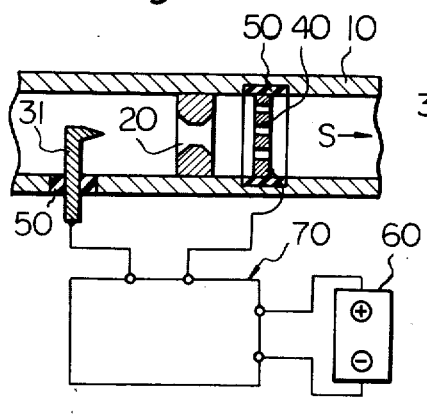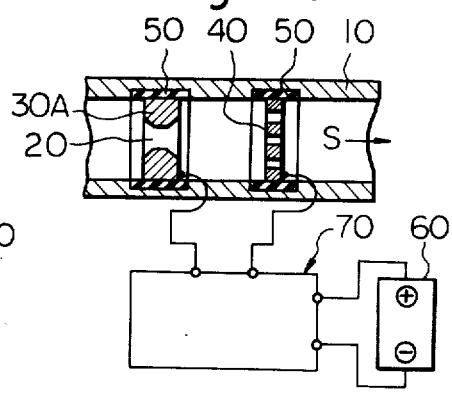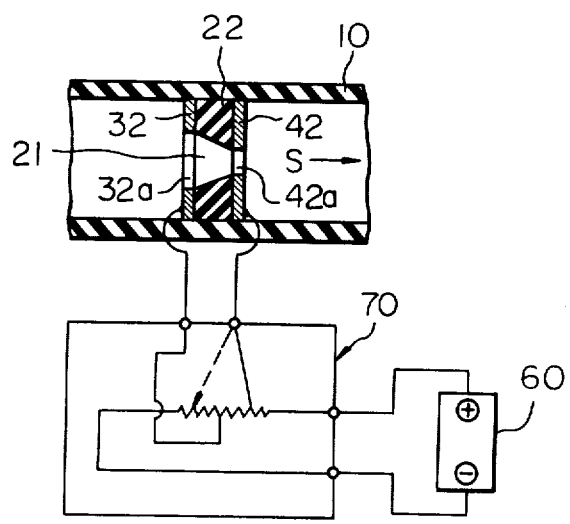

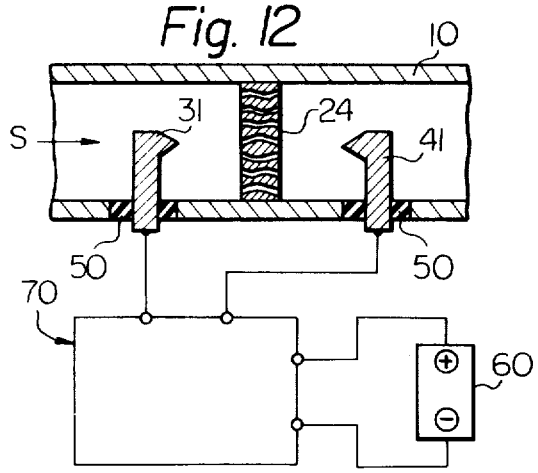
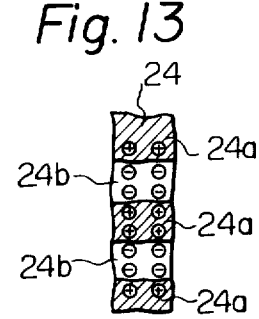
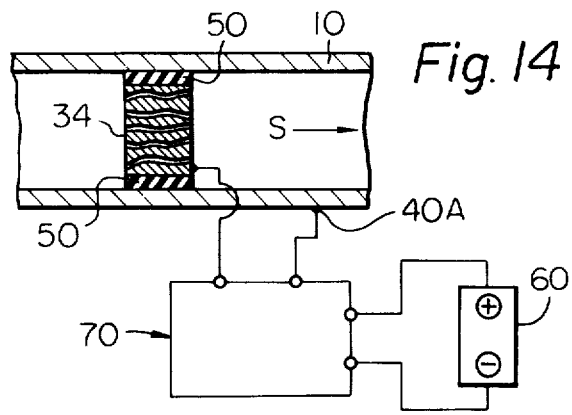
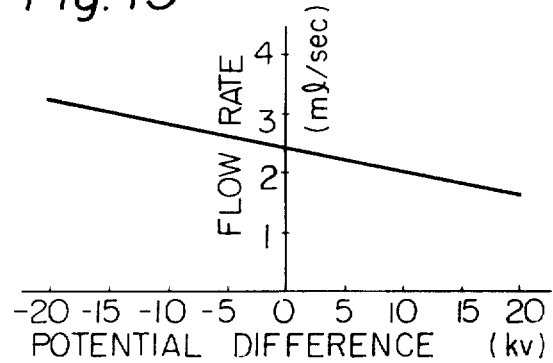

ELECTROSTATIC APPARATUS FOR CONTROLLING FLOW RATE OF LIQUID

BACKGROUND OF THE INVENTION

The invention relates to an electrostatic apparatus for controlling the volume rate of flow of liquid.

The conveyance of liquid is generally accomplished by either pressurizing or by suction. A base volume rate of flow of a liquid being conveyed is adjusted by setting the pressure for conveyance and/or using a metering device such as a metering orifice.

A mechanical flow control device such as a valve or an injector which is operated electrically, hydraulically or pneumatically is used when a minute regulation of the flow rate around the preset basic flow rate is intended. There is a limit to the responsiveness of such a flow rate control device due to the inclusion of a moving mechanism. In the case of the flow control device being of the on-off functioning type such as a solenoid valve, the operation of the device tends to cause pulsation in the liquid flow as a factor unfavorably affecting the precision in the control. Accordingly a practical control of the flow rate encounters a technical difficulty when it is necessary to accomplish the control with very high precision.

A fuel supply system in automotive internal combustion engines is a typical example of liquid conveyance systems which require a high precision control of the flow rate. In this fuel supply system, metering of a liquid fuel is accomplished by means of either a carburetor or a fuel injector in order to prepare a combustible air-fuel mixture having a desired air/fuel ratio. In recent years, there is a strong and growing demand for a technique for very precisely controlling the air/fuel ratio in the field of automotive engines since such a technique is almost a requisite for the success of recently developed methods for reducing the emission of pollutants and/or improving the fuel economy. Principally this demand can be satisfied by an electronic air/fuel ratio control system which performs a feedback control of the fuel supply rate based on the concentration of a specific component of the exhaust gas. This air/fuel ratio control system usually includes an electromagnetic valve (which has the aforementioned disadvantages) as a fuel supply rate regulation means, so that the performance of this control system in practical application is not yet fully satisfactory. At present, however, there is no different type of flow control device which serves as a superior substitute for the electromagnetic valve in the feedback air/fuel ratio control system.

SUMMARY OF THE INVENTION

It is an object of the present invention to provide a novel type of apparatus for controlling the volume rate of flow of a liquid, which apparatus is electrically operated and includes no mechanically moving part.

It is another object of the invention to provide a flow rate control apparatus for liquids, which apparatus features a good responsiveness to an electrical control signal and a high reliability in practical use.

It is a still another object of the invention to provide a flow rate control apparatus for liquids, which apparatus produces an electric field in a stream of a liquid and can control the volume flow rate either continuously or discontinuously.

It is a still further object of the invention to provide an improved air/fuel ratio control system for an internal combustion engine by using a flow rate control apparatus according to the invention as a fuel supply rate control element in the control system.

According to the invention, apparatus for controlling the volume flow rate of a liquid in a liquid passage comprises (a) a first electrode fixedly disposed in the liquid passage, (b) a second electrode fixedly disposed in the liquid passage at a distance from the first electrode in the direction of the liquid flow and (c) an electric circuit which is connected to the first and second electrodes to produce an electric field in the liquid between the electrodes thereby to impose a propulsive stress on the liquid toward one of the first and second electrodes. This circuit includes a control circuit for varying the magnitude and/or the polarity of a DC high voltage impressed across the electrodes.

This flow rate control apparatus may optionally have a partition member which is interposed between the two electrodes against the liquid flow and forms therein a flow-constricting orifice.

The first and second electrodes can variously be shaped so long as they do not offer any significant obstruction to the liquid flow. For example, the electrodes may individually take the form of a perforated plate, net, porous metal mass of an open cellular structure, needle or knife blade. One of the electrodes may be designed to serve also as the aforementioned partition member for forming the orifice.

This flow rate control apparatus operates on the following principle. When a DC high voltage ranging from, e.g., a few kilovolts to several tens of kilovolts is impressed across a pair of electrodes disposed in a liquid, an electric field is produced in the liquid between the two electrodes. The electric field causes the liquid particles to become charged, so that a propulsive stress is imposed on the liquid. Consequently, a flow of the liquid from one of the electrodes toward the other electrode is produced. This phenomenon is known by the term "pumping phenomenon" and described in textbooks on static electricity. The direction of the thus produced liquid flow with respect to the polarity of the voltage applied to the electrodes depends on the kind of the liquid. For example, alcohol flows toward the positive electrode. The magnitude of the propulsive stress, i.e., the rate of the liquid flow attributed to the electric field, increases as the applied voltage increases. When the two electrodes are disposed in a liquid flow at a distance therebetween in the direction of the liquid flow, the pumping phenomenon causes a change in the rate of the liquid flow. The scale of the change can be controlled by varying the strength and/or polarity of the electric field in the liquid flow.

To facilitate the pumping phenomenon to occur, the flow rate control apparatus may be supplemented by a corona discharge circuit of which electrodes are disposed in a liquid flow at a section upstream of the aforementioned electrodes for producing the electric field.

BRIEF DESCRIPTION OF THE DRAWINGS

FIGS. 2, 3-a, 3-b and 4 respectively show four different modifications of the flow rate control apparatus of FIG. 1;

FIGS. 10–12 and 14 respectively show four still different modifications of the flow rate control apparatus of FIG. 1;

FIG. 13 is an explanatory and fragmentary illustration of a flow-constricting orifice in the control apparatus of FIG. 12;

FIG. 15 is an exemplary graph showing the ability of a flow rate control apparatus according to the invention;

DESCRIPTION OF PREFERRED EMBODIMENTS

Figure 1:
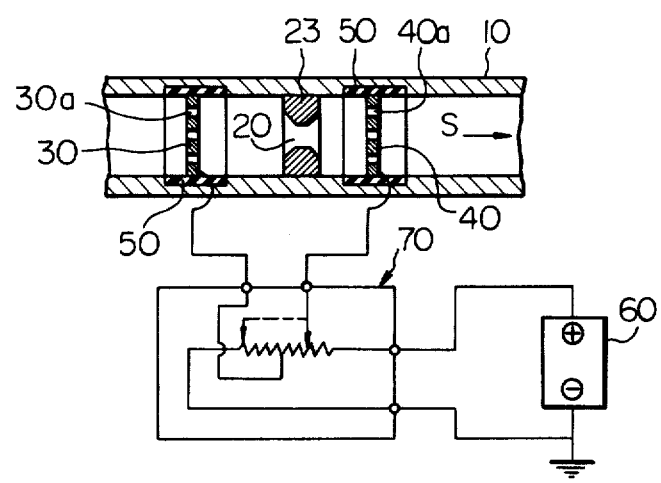
FIG. 1 is schematic and sectional presentation of a flow rate control apparatus for a liquid stream in a pipe as an embodiment of the invention.

Referring to FIG. 1, a pipe 10 represents means to provide a passage for the conveyance of a liquid. A liquid stream in the pipe 10 is omitted from the illustration for simplicity, but the direction of the stream is indicated by the arrow S. A flow-constricting or metering orifice 20 is formed in the pipe 10 or liquid passage as an aperture in a partition member 23 which blocks the liquid passage 10. A pair of electrodes 30 and 40 are disposed in and secured to the pipe 10 interposing the metering orifice 20 therebetween. In the case of FIG. 1, each of these electrodes 30 and 40 takes the form of a plate which is arranged normal to the direction S of the liquid stream and has a multiplicity of apertures 30a (or 40a). When the pipe 10 is of an electrically conductive material, insulators 50 are interposed between the pipe 10 and the electrodes 30, 40. Outside the pipe 10, leads (no numeral) for the electrodes 30, 40 are connected to a high voltage DC power supply 60 via a controller 70. The output voltage of the power supply 60 is at a level of 1–100 kV. The controller 70 can vary both the magnitude and polarity of the potential applied to the electrodes 30, 40.

The volume rate of flow of the liquid in the pipe 10 can fundamentally be determined by the effective area of the orifice 20. The flow rate remains constant while the electrodes 30, 40 are disconnected from the power supply 60 unless there arises a change in the pressure or linear velocity of the streaming liquid.

For convenience, the electrode 30 which is located upstream of the orifice 20 will be called the first electrode and the other electrode 40 (located downstream) the second electrode. When the first electrode 30 is connected to the negative terminal of the power supply 60 and the second electrode 40 to the positive terminal (assuming that the liquid is, for example, alcohol) to produce an electrical field between the two electrodes 30 and 40, the liquid in the electric field is caused to migrate toward the second or positive electrode 40 by the above described propulsive stress or "pumping" phenomenon. Since the direction of the migration agrees with the direction S of the liquid stream, the pumping phenomenon results in an increase in the linear velocity of the liquid stream at the orifice 20. Naturally an increase occurs in the flow rate of the liquid in the pipe 10.

When the connection of the two electrodes 30 and 40 to the negative and positive terminals of the power supply 60 is reversed, the liquid in a resultant electric field tends to migrate toward the first electrode 30. Accordingly the stream in the direction S is decelerated and the volumetric flow rate decreases. The magnitude of the increase or decrease in the volumetric flow rate can be controlled by regulating the voltage applied across the two electrodes 30 and 40. When the liquid is of a type which migrates in an electric field toward a negative electrode, the above described relationship between the acceleration or deceleration of the stream and the polarity of the electrodes 30, 40 is of course reversed.

It will be understood that the construction or function of the controller 70 shown in FIG. 1 is no more than symbolical and that, in practical applications, the controller 70 may comprise an electronic circuit which is capable of automatically selecting the polarity of the potential applied to the electrodes 30, 40 and regulating the voltage in response to an externally supplied electrical control signal. There will be no need of giving particulars of the controller 70 in view of the state of the art.

As an alternative for a direct control of the voltage applied to the electrodes 30, 40, the strength of the electric field can be controlled by a pulse modulation technique. In this technique, a high DC voltage is applied to the electrodes in the form of a series of pulses. The amplitude of the pulses is kept constant but the mark-to-space ratio is varied, so that a variation occurs in an average or effective voltage across the electrodes 30 and 40.

A variation in the volumetric flow rate caused by the apparatus of FIG. 1 depends on the strength of the electric field produced in the pipe 10, so that the two electrodes 30, 40 are preferably arranged at a short distance from each other. The electrodes 30, 40 are not necessarily designed as shown in FIG. 1 but may take various different forms so long as the electrodes 30, 40 do not offer a substantial obstruction to the liquid stream. For example, a net (not shown) is functionally an exact equivalent for the perforated plate as the individual electrode 30 or 40 in FIG. 1.

Figure 2:
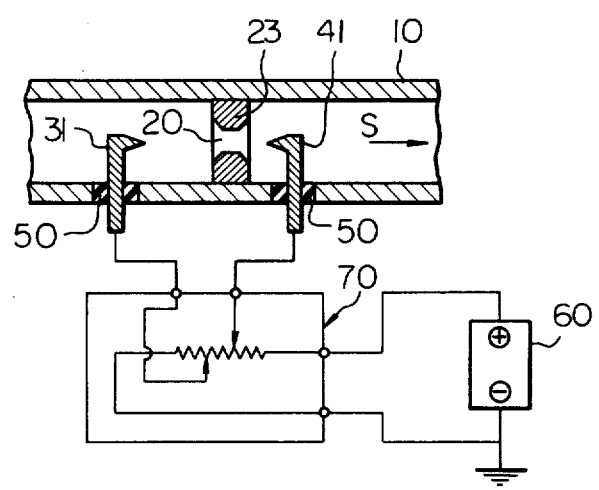

FIG. 2 shows a flow rate control apparatus which is almost identical with the apparatus of FIG. 1. As a sole difference, the apparatus of FIG. 2 has a pair of needle-shaped electrodes 31 and 41 in place of the perforated plate electrodes 30, 40 in FIG. 1. These needle-shaped electrodes 31, 41 are pointed opposite to each other (and hence toward the orifice 20) and held in axial alignment with the orifice 20. The needle-shaped electrodes 31, 41 are advantageous in that they offer the least resistance to the liquid stream and add an impulsive effect on the migration of the liquid. It is also permissible to combine the perforated plate electrode 30 or 40 (or a net electrode) with the needle-shaped electrode 31 or 41 as shown in FIG. 3-a.

The presence of the flow-constricting orifice 20 which has been described as to serve a metering function is favorable for enhancing the above described pumping effect but is not an indispensable requisite to the apparatus of the invention. A basic flow rate of the liquid may be determined by the provision of a metering orifice independently of and distantly from the electrodes of this apparatus. Any of the apparatus of FIGS. 1-3a serves a flow rate control function even when the orifice 20 is omitted. Contrariwise, it is also possibile to utilize a member 30A (shown in FIG. 3-b) having the orifice 20 formed therein as one of a pair of electrodes (of course the orifice member 30A must be of a conductive material in this case). Still alternatively, the two electrodes represented by 30 and 40 may be located both on one side (either the upstream or downstream side) of the orifice 20.

In FIG. 4, a partition member 22 which is made of an insulating material and has a tapered hole 21 in its central area is disposed in the pipe 10 to peripherally make an intimate contact with the inside of the pipe 10. The hole 21 has the shape of a truncated cone. The partition member 22 is oriented normal to the liquid stream in the pipe 10 such that the streaming liquid passes through the conical hole 21 from the base of the cone to the truncated end. A first electrode plate 32 having a central aperture 32a is placed on the upstream side of the insulating member 22, and a second electrode plate 42 having a central aperture 42a is placed on the other side of this member 22. In FIG. 4, it is assumed that the pipe 10 is of an insulating material, so that the electrodes 32, 42 are in direct contact with the pipe 10 (without interposing insulators 50 in FIG. 1). The apertures 32a and 42a respectively have sufficiently large areas so that the hole 21 may not be covered with the electrode plates 32, 42 in the least. The electrodes 32, 42 are connected to the DC power supply 60 via the controller 70 as in the flow rate control apparatus of FIG. 1.

The thus constructed flow rate control apparatus operates on the same principle and in the same manner as the apparatus of FIG. 1. The hole 21 may be dimensioned so as to serve also as a metering orifice. The construction shown in FIG. 4 is quite convenient for manufacture and assemblage and allows the electrodes 32 and 42 to have a minimum distance therebetween. The presence of these electrode plates 32 and 42 in the pipe 10 causes no extra resistance to the liquid stream. Besides, the truncated conical shape of the hole 21 aids the migration of the liquid, particularly migration toward the second electrode 42, when an electric field is produced between the electrode plates 32 and 42, that is, in the hole 21.

The impulsive action of an electric field on the liquid streaming in the pipe 10 differs among different types liquids. For example, the pumping phenomenon can easily be realized for alcohol but is hard to realize for some liquids which generally exhibit very low electric conductivity as typified by hexane. The difficulty in realizing the pumping phenomenon, that is, controlling the flow rate according to the invention, for liquids of large dielectric constants can remarkably be relieved by the employment of the electrode assembly of FIG. 4.

As described hereinbefore, it is not a requisite that the conical hole 21 of the partition member 22 serves as a metering orifice. When there is no need of interposing a metering orifice between the electrode plates 32 and 42, the thickness of the plate member 22 and the dimensions of the conical hole 21 can be determined only with consideration of the pumping efficiency.

Figure 5:
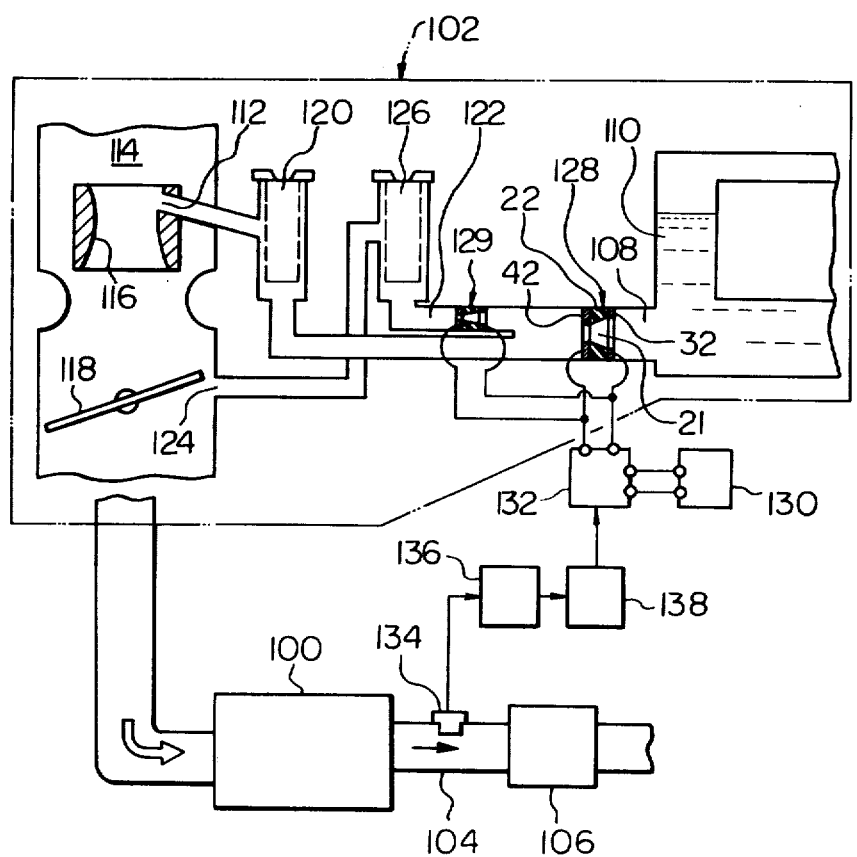
FIG. 5 shows the application of a flow rate control apparatus according to the invention to a feedback control system for controlling the air/fuel ratio of an air-fuel mixture in an internal combustion engine.

A flow rate control apparatus according to the invention is useful as a fuel supply rate control element in the aforementioned feedback air/fuel ratio control system for an internal combustion engine as shown in FIG. 5 by way of example.

An automotive internal combustion engine 100 in FIG. 5 is equipped with a carburetor 102, and a catalytic converter 106 occupies part of exhaust pipe 104 to remove noxious components from the exhaust gas. In the carburetor 102, a fuel discharge passage 108 connects a float chamber 110 to a main fuel nozzle 112 which opens into an induction passage 114 at its venturi section 116. A throttle valve is indicated at 118. The fuel passage 108 is provided with a main air bleed passage 120 to admit a suitable quantity of air into the fuel. A slow-speed fuel passage 122 branches from the fuel passage 108 and terminates at a slow-speed fuel nozzle 124 which opens into the induction passage 114 at a section slightly downstream from the the throttle valve 118. The slow-speed fuel passage 122 is provided with an independent air bleed passage 126. In these respects, the carburetor 102 has a well known construction.

An electrode assembly 128 of a flow rate control apparatus according to the invention is fixedly disposed in the fuel discharge passage 108. This electrode assembly 128 is illustrated by way of example as the combination of the electrode plates 32, 42 and the conically holed insulating member 22 of FIG. 4. The electrodes 32, 42 are connected to a high voltage DC power supply 130 via an electronic controller 132. To estimate an actual air/fuel ratio of an air-fuel mixture consumed in the engine 100, an exhaust sensor 134 is disposed in the exhaust pipe 104 at a section upstream of the catalytic converter 106. A typical example of the exhaust sensor 134 is an oxygen sensor of the type of an oxygen concentration cell using a solid electrolyte. The air/fuel ratio control system includes a deviation detection circuit 136 and an operational circuit 138.

The exhaust sensor 134 continuously provides an electrical signal representing the concentration of a specific component (which may be $O_2$, CO, HC or NOx) of the exhaust gas as an indication of the air/fuel ratio realized in the engine 100. The deviation detection circuit 136 produces a deviation signal representing the magnitude of a deviation of the output voltage of the sensor 134 from a preset reference voltage. The operational circuit 138 produces a control signal based on the deviation signal supplied from the circuit 136. This control signal may be composed of a component proportional to the magnitude of the aforementioned deviation and another component implying an integral of the deviation as a function of time. The controller 132 has the function of varying the magnitude and polarity of a high DC voltage applied to the electrode assembly 128 in response to the control signal supplied from the operational circuit 138. Consequently the fuel supply rate to the induction passage 114 can minutely be controlled so as to correct a deviation of the actual air/fuel ratio from a preset ratio which is chosen to optimize both the performance of the engine 100 and the function of the catalytic converter 106 (or any substitute). As is known, the conversion efficiency in the catalytic converter 106 greatly depends on the composition of the exhaust gas and, hence, on the air/fuel ratio of a mixture consumed in the engine 100. For example, a so-called "three-way catalyst", which can catalyze both the reduction of NOx and the oxidation of CO and HC, exhibits its full ability when the air/fuel ratio is maintained at a definite value in the vicinity of a stoichiometric air/fuel ratio.

Optionally, another electrode assembly 129 according to the invention may be installed in the slow-speed fuel discharge passage 122.

The air/fuel ratio control system shown in FIG. 5 is fundamentally a known system. In a conventional control system of this type, the fuel supply rate in the carburetor 102 is varied by the use of an electromagnetic electromechanical device which is operated based on the control signal produced by the operational circuit 138. The replacement of the electromechanical device by the flow rate control apparatus according to the invention brings about improvements on the responsiveness of the fuel supply circuit to the control signal, precision in the control and reliability of the control system.

Figure 6:
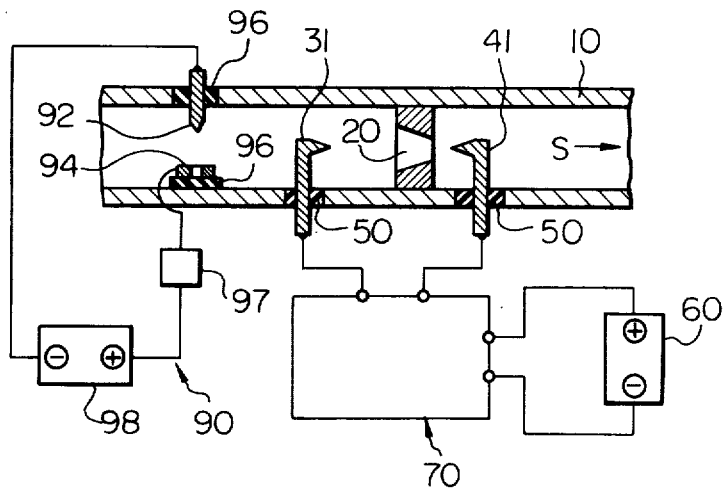
FIG. 6 is a schematic and sectional presentation of a flow rate control apparatus which is fundamentally similar to the control apparatus of FIG. 2 but additionaly has a corona discharge circuit as an auxiliary component.
Figure 7:
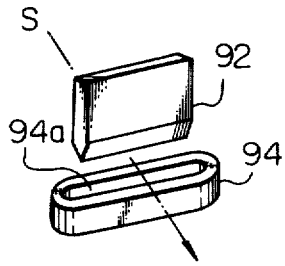
FIGS. 7 and 8 are perspective views of two differently designed pairs of electrodes for the corona discharge circuit in FIG. 6.

In FIG. 6, the flow rate control apparatus of FIG. 2 is supplemented by a corona discharge circuit 90 which is arranged to make corona discharge in the liquid flowing through the pipe 10, conveniently in a direction substantially normal to the direction S of the liquid flow, at a section upstream of the first (upstream side) electrode 31. This corona discharge circuit 90 includes a negative electrode 92 inserted into the pipe 10, a positive electrode 94 placed in the pipe 10 to be spaced from and opposite to the negative electrode 92, a DC high voltage power supply 98 and a discharge controller 97. When the pipe 10 is of a conductor, insulators 96 are interposed between the pipe 10 and the electrodes 92, 94. As shown in FIG. 7, the negative electrode 92 has the shape of knife blade, and the positive electrode 94 in this example is a plate member of an elongate plan view geometry with an elongate slit 94a which could fit with the blade of the electrode 92 if the electrodes 92 and 94 were contacted. The blade and slit of the electrodes 92, 94 in this case are oriented substantially normal to the direction S of the liquid flow.

The application of a DC high voltage across the electrodes 92, 94 causes corona discharge in the liquid, so that the liquid arrives at the electrode assembly (31, 41, 20) in an electrically charged state. This is of great aid for realizing the intended migration of the liquid in an electric field produced between the two electrodes 31 and 41. Due to the addition of the corona discharge circuit 90 to a flow control rate apparatus according to the invention, the pumping phenomenon can be realized without difficulty even in hexane as an example of liquids which are rather insensitive to an electric field. Since hexane is a major component of gasoline, the use of the corona discharge circuit 90 as an auxiliary element of the flow rate control apparatus is valuable particularly when the invention is applied to the control of fuel supply rate in a gasoline engine.

Figure 8:
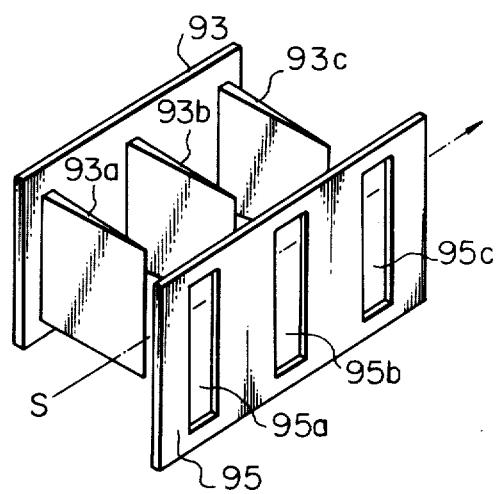

The effect of the corona discharge circuit 90 can be augmented by employing a multiple electrode assembly as shown in FIG. 8 by way of example. In this case, a negative electrode 93 has three parallel blades 93a, 93b and 93c arranged in file in the direction S of the liquid flow, and a positive electrode 95 has three slits 95a, 95b and 95c arranged respectively opposite to the three blades 93a, 93b and 93c.

Figure 9:
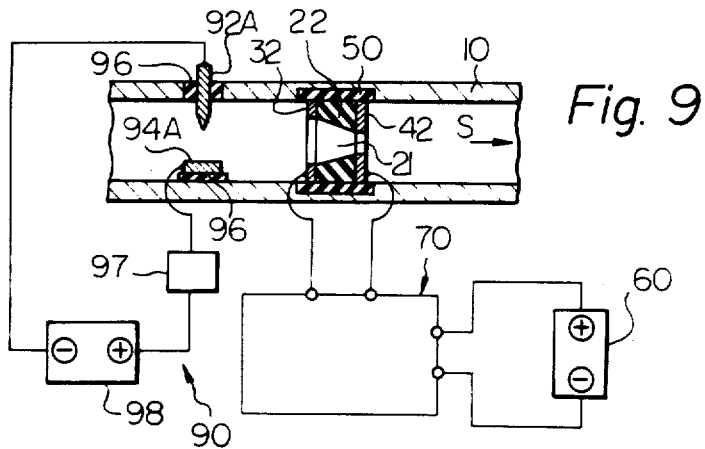
FIG. 9 is fundamentally similar to FIG. 6 but shows the addition of a corona discharge circuit to the control apparatus of FIG. 4.

The corona discharge circuit 90 may be supplemented to any of the hereinbefore illustrated flow rate control apparatus. As an additional example, FIG. 9 shows the addition of the corona discharge circuit 90 to the flow rate control apparatus of FIG. 4. Besides, FIG. 9 shows that the electrodes of the corona discharge circuit 90 may optionally be a combination of a needle-shaped negative electrode 92A and a positive electrode 94A of a simple (solid) plate member.

Figure 10:
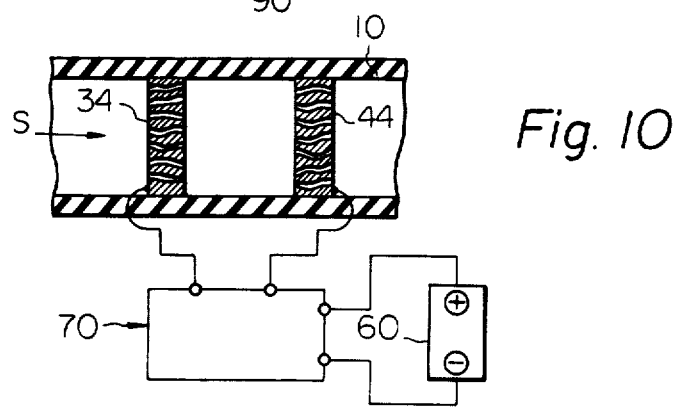

As a modification of the perforated plates 30 and 40 (or nets) as the electrodes in the flow rate control apparatus of FIG. 1, it is possible to use a porous mass of a metal having an open cellular structure such as a sponge metal, a sintered metal mass or a mesh structure of a metal wire when a resistance to the flow of the liquid is not of great concern. FIG. 10 shows a flow rate control apparatus having a pair of electrode plates 34 and 44 which are both of a porous metal of the aforementioned type. It will be apparent that this apparatus serves fundamentally the same function as the apparatus of FIG. 1 (FIG. 10 shows the case of the orifice 20 being omitted).

Figure 11:
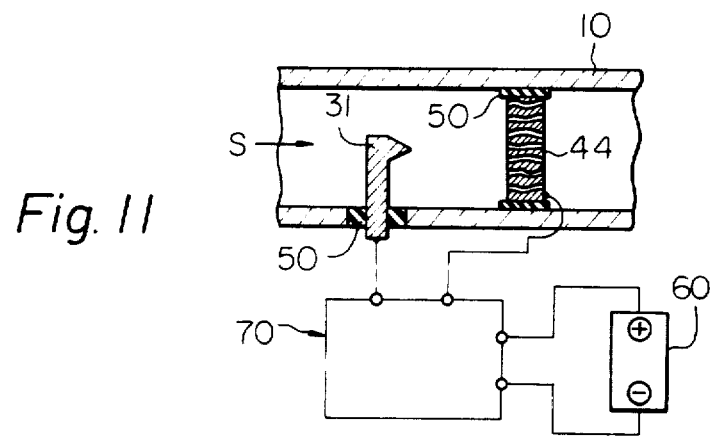

A porous metal plate electrode 34 or 44 may be used in combination with any of solid metal electrodes described hereinbefore. For example, FIG. 11 shows a combination of the needle-shaped electrode 31 as the upstream side electrode and the porous metal plate 44 as the other electrode.

FIG. 12 shows a different use of a porous mass of an open cellular structure in a flow rate control apparatus according to the invention. In this case, the apparatus has a pair of needle-shaped electrodes 31 and 41 as an example of hereinbefore described solid electrodes, and a plate 24 of a porous substance is fixedly interposed between these electrodes 31 and 41. The porous substance may be a metal as in the case of the electrodes 34, 44 in FIG. 10 but may alternatively an insulating material such as a sintered glass composition, porous ceramics or foam plastics.

When a liquid flows through the porous plate 24, an electric double-layer appears at each interface between the pore wall 24a of the plate 24 and the liquid in each pore 24b, so that a portion of the liquid in the neighborhood of the interface is electrically charged as explanatorily shown in FIG. 13. Since an electric field is produced (by the application of DC high voltage to the electrodes 31 and 41) while the liquid in the porous plate 24 is in such a state, the liquid readily responds to the electric field and migrates toward one of the electrodes 31 and 41. Accordingly, the provision of the porous plate 24 is particularly effective when the liquid is one which is rather insensitive to an electric field as exemplified by hexane.

This effect of a porous plate can be gained also when the porous plate is used as an electrode of the flow rate control apparatus. For example, the flow rate control apparatus of FIG. 14 has the plate electrode 34 of a porous metal as the upstream side electrode and utilizes the pipe 10 itself as the other electrode 40A.

FIG. 15 shows the result of an experiment which was performed to examine the characteristic of the flow rate control apparatus of FIG. 12. The pipe 10 had an inner diameter of 20 mm and the liquid was gasoline. The porous plate 24, 20 mm in diameter and 1.5 mm in thickness, was of sponge nickel with pores of 0.2–0.5 mm in diameter. The gasoline was streamed in the pipe 10 at a basic rate of 2.5 ml/sec when no voltage is impressed across the electrodes 31 and 41.

Figure 16:
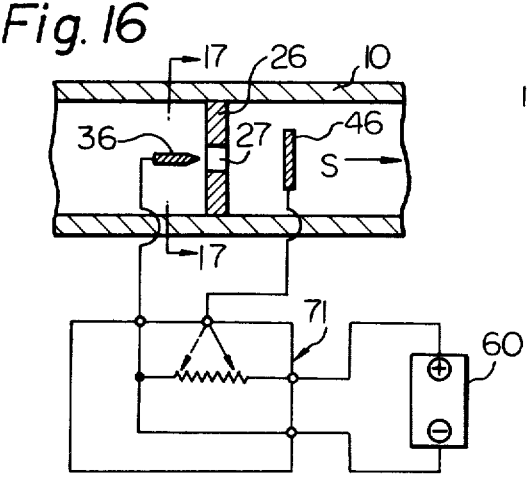
FIGS. 16 and 18 respectively show two different modifications of the control apparatus of FIG. 3.
Figure 17:
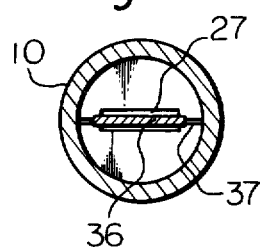
FIG. 17 is a cross-sectional view taken along the line 17—17 of FIG. 16.

FIG. 16 shows a slightly different type of construction of a flow rate control apparatus according to the invention, which construction is practicable and advantageous when it is not intended to reverse the polarity of the voltage impressed across the two electrodes during operation of the apparatus. A first electrode 36 of this flow rate control apparatus has the shape of a knife blade and is arranged in the pipe 10 such that the liquid flows along the blade from its root to the edge. Accordingly certain support elements of an insulating material as shown at 37 in FIG. 17 may be needed for securing the electrode 36 to the pipe 10. A plate member 26 having an elongate slot 27 as an orifice is received in the pipe 10 close to and downstream from the electrode 36 such that the slot 27 is just opposite to the edge of the electrode 36. A second electrode 46, which is by way of example, a plate member having a considerable smaller area than the cross-sectional area of the pipe 10, is disposed in the pipe 10 at a certain distance from the slotted plate member 26 in the direction S of the liquid flow. These electrodes 36 and 46 are connected to the DC high voltage power supply 60 via a voltage controller 71.

When a high voltage of the order of $10^3$–$10^4$ volts is impressed across the electrodes 36 and 46, an electric field is produced between the electrodes 36, 46 as in the hereinbefore described apparatus. As a feature of the apparatus of FIG. 16, the strength of the electric field is considerably nonuniform. The liquid particules are charged in the neighborhood of the blade-shaped electrode 36, and a greater field strength causes the charged particles to be attracted toward the plate electrode 46. Then a propulsive force acts on the liquid stream. This effect can be gained even if the slotted plate 26 is not interposed between the electrodes 36 and 46, but the presence of the orifice 27 just downstream from the edge of the electrode 31 causes the contraction of the flow of the charged liquid, meaning a rise in the ion density in the liquid, and accordingly is quite effective in developing a great propulsive force.

The magnitude of the thus developed propulsive force can be varied by controlling the voltage impressed across the electrodes 36, 46. In the apparatus of FIG. 16, the propulsive force acts always in the direction S of the liquid flow, so that the application of a high voltage to the electrodes 36, 46 results in a rise in the flow rate. The magnitude of the rise depends on the applied voltage. If it is intended to accomplish the control of the flow rate by lowering the flow rate to a variable extent, the blade-shaped electrode 36 is placed on the downstream side of the slotted member 26 and the plate electrode 46 on the upstream side.

The blade-shaped electrode 36 can be replaced by a thin plate member (not shown) which is provided with no blade edge, resulting in that no significant lowering occurs in the above described effect. The plate electrode 46 may be replaced by the perforated plate electrode 40 in FIG. 1, a net electrode (not shown) or the porous electrode 44 in FIG. 11.

Figure 18:
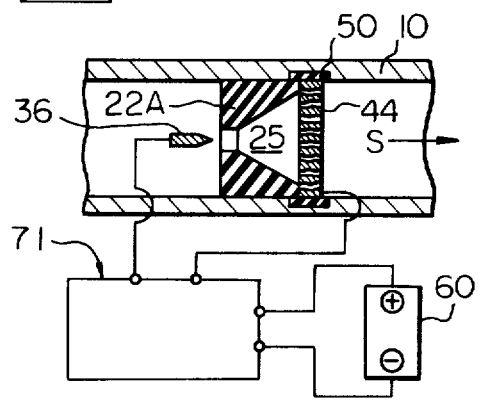

In FIG. 18, the knife blade electrode 36 is combined with the porous plate electrode 44, and a flow contraction member 22A of an insulating material is interposed between the electrodes 36 and 44 and forms therein an orifice 25 generally in the form of a truncated cone. The edge of the electrode 36 is close to the top end of the truncated cone and the porous plate electrode 44 is attached to the base of the cone. The function of this flow rate control apparatus is principally similar to that of the apparatus of FIG. 16.

Figure 19:
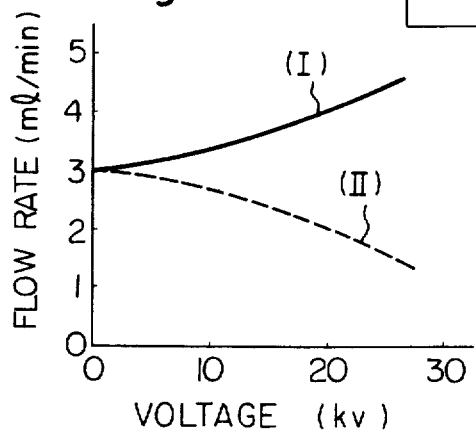
FIGS. 19 and 20 are exemplary graphs showing the operating characteristic of a flow rate control apparatus according to the invention.

FIG. 19 shows the performance of the apparatus of FIG. 16 by way of example when hexane is streamed in the pipe 10 at a basic flow rate of 3 ml/min. The curve (I) represents a rise in the flow rate as a function of voltage impressed across the electrodes 36, 46. The curve (II) represents a decrease in the flow rate when the electrodes 36 and 46 were reversely arranged with respect to the direction S of the flow of hexane.

Figure 20:
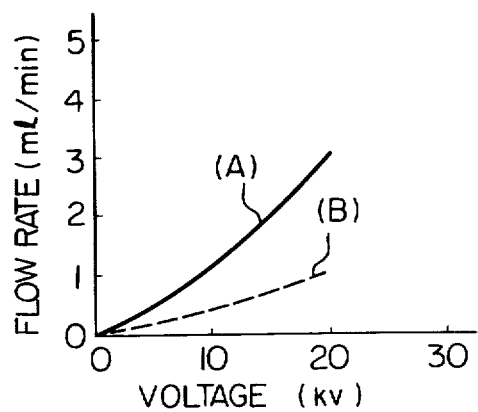

In FIG. 20, curve (A) shows the result of an experiment on the apparatus of FIG. 16 using hexane as the liquid. In this experiment, no external force is exerted on the hexane other than the application of a high voltage across the electrodes 36, 46, so that the flow rate was zero unless the flow rate control apparatus is operated. The application of a high voltage across the electrodes 36, 46 caused the hexane in the pipe 10 to flow, and an appreciable rise in the flow rate was observed as the voltage was raised. Curve (B) shows the result of the same experiment for the apparatus of FIG. 4.

The apparatus of FIG. 16 or FIG. 18 can develop a great and stable propulsive force as demonstrated by this experiment and accordingly is useful not only as a control apparatus for a minute regulation of flow rate but also as a liquid conveyance means, i.e., a pump, of a small delivery capacity.

The orifice 27 formed as a slot of a constant and relatively wide area does not offer a significant resistance to a liquid flow and accordingly is of practical use over a wide range of flow rate. When the flow rate control apparatus of FIG. 16 is applied to the fuel passage 108 of the carburetor 102 in FIG. 5 with the electrodes 36, 46 and the slotted plate 26 in series arrangement with the fuel nozzle 112, the slot 27 is made to have a larger area than the effective area of the nozzle 112. If such design is impossible or inconvenient, the fuel passage 108 may be designed to have a by-pass passage (not shown), in which the electrodes 36, 46 and the slotted plate 26 are installed.

Figure 21:
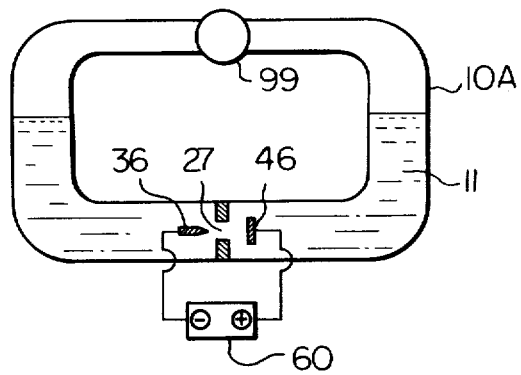
FIG. 21 shows a testing apparatus used for examining the responsiveness and the stability in the operation of a flow control apparatus according to the invention.
Figure 22:
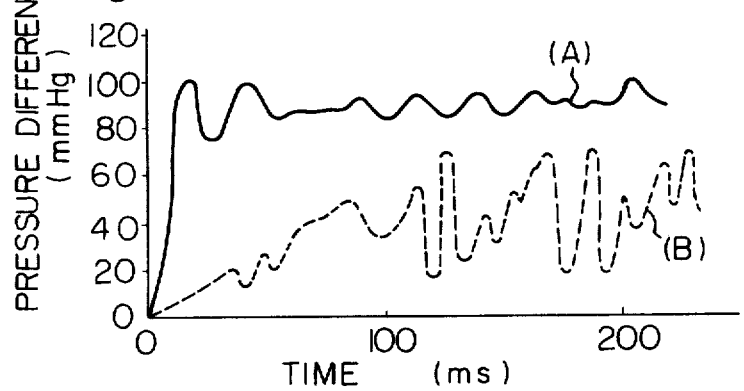
FIG. 22 is a graph showing an example of experimental results obtained by the use of the testing apparatus of FIG. 21.

The stableness of the propulsive force developed by the apparatus of FIG. 16 was examined using a test apparatus shown in FIG. 21. A closed U-tube 10A was partly filled with hexane 11. The blade-shaped electrode 36, plate electrode 46 and the slotted plate 26 were disposed in the middle of the horizontal part of the U-tube 10A. A constant voltage of 20 kV was continuously impressed across the electrodes 36 and 46, and a pressure difference between the right and left halves of the U-tube 10A was continuously measured with a differential pressure gage 99. The thus measured pressure difference corresponds to the propulsive force attributed to an electric field produced in hexane. The result is represented by curve (A) in FIG. 22. Curve (B) shows a similar experimental result obtained for the flow rate control apparatus of FIG. 4. The curve (A) implies a better stability in the propulsive force and a quicker response of the electrode-and-orifice assembly to the application of voltage than the curve (B).

What is claimed is:

1. Apparatus for controlling the volume rate of flow of a liquid in a liquid passage, comprising:
 a body of an electrically insulating material fixedly disposed in said liquid passage to occupy and block a section of a definite length of said liquid passage, said body being formed with a through hole having generally the shape of a truncated cone with its axis in the direction of liquid flow and having a largest cross-sectional area and a smallest cross-sectional area respectively at an upstream end and at a downstream end thereof such that said through hole constitutes a flow-constricting orifice which regulates liquid flow through said passage and determines a base flow rate of liquid therethrough;

a first plate electrode affixed to the upstream end of said body and having a circular aperture axially in alignment with said through hole of said body and of a cross-sectional area not smaller than said largest cross-sectional area of said through hole;

a second plate electrode affixed to the downstream end of said body and having a circular aperture axially in alignment with said through hole of said body and of a cross-sectional area not smaller than said smallest cross-sectional area of said through hole; and an electric circuit which is connected to said first and second electrodes to produce an electric field in the liquid between said first and second electrodes to thereby impose a propulsive stress on the liquid toward one of said first and second electrodes, and to thereby vary the flow rate of said liquid from said base flow rate, said circuit including a control means for varying at least one of the magnitude and the polarity of a DC voltage impressed across said first and second electrodes.

2. A flow rate control apparatus as recited in claim 1, further comprising a third electrode and a fourth electrode which are fixedly disposed in the liquid passage at a section upstream of said first and second electrodes and having a shape which includes a corona discharge in the liquid when a sufficiently high voltage is applied thereto and another electric circuit to impress a DC high voltage across said third and fourth electrodes.

3. A flow rate control apparatus as claimed in claim 2, wherein said third and fourth electrodes are arranged such that said corona discharge occurs generally in a direction normal to the direction of the liquid flow.

4. A flow rate control apparatus as claimed in claim 3, wherein said third electrode takes the form of a knife blade with its edge directed to said fourth electrode, said fourth electrode taking the form of a plate having a slit shaped and arranged to be opposite to the edge of said knife blade.

5. A flow rate control apparatus as claimed in claim 3, wherein said third electrode takes the form of at least two knife blades arranged parallel to each other and in a file in the direction of the liquid flow, said fourth electrode taking the form of a plate having at least two slits shaped and arranged to respectively be opposite to the respective edges of said knife blades.

6. A flow rate control apparatus as claimed in claim 3, wherein said third electrode takes the form of a needle-shaped member pointed toward said fourth electrode, said fourth electrode taking the form of a plate member.

7. In a feedback type air/fuel ratio control system for maintaining the air/fuel ratio of a mixture of air and a liquid fuel being supplied to an internal combustion engine from an air-fuel proportioning device at a preset ratio, the control system having an exhaust sensor which is disposed in the exhaust line of the engine and produces an electrical signal representing the concentration of a specific component of the exhaust gas as an indication of an actual air/fuel ratio realized in the engine, a control circuit for producing a control signal based on a deviation of said electrical signal from a reference signal, and an electrically operated device for varying the rate of fuel supply through a fuel passage in the air-fuel proportioning device in response to said control signal, the improvement comprising said electrically operated device being a volumetric flow rate control apparatus having a body of an electrically insulating material fixedly disposed in said fuel passage to occupy and block a section of a definite length of said fuel passage, said body being formed with a through hole having generally the shape of a truncated cone with its axis in the direction of fuel flow and having a largest cross-sectional area and a smallest cross-sectional area respectively at an upstream end and at a downstream end thereof such that said through hole constitutes a flow-constricting orifice which regulates fuel flow through said passage and determines a base flow rate of fuel therethrough;

a first plate electrode affixed to the upstream end of said body and having a circular aperture axially in alignment with said through hole of said body and of a cross-sectional area not smaller than said largest cross-sectional area of said through hole;

a second plate electrode affixed to the downstream end of said body and having a circular aperture axially in alignment with said through hole of said body and of a cross-sectional area not smaller than said smallest cross-sectional area of said through hole; and an electric circuit which is connected to said first and second electrodes to produce an electric field in the fuel between said first and second electrodes to thereby impose a propulsive stress on the fuel toward one of said first and second electrodes, and to thereby vary the flow rate of said fuel from said base flow rate, said circuit including a control means for varying at least one of the magnitude and the polarity of a DC voltage impressed across said first and second electrodes.

* * * * *